United States Patent
Borglum

(10) Patent No.: US 7,234,720 B2
(45) Date of Patent: Jun. 26, 2007

(54) APPARATUS FOR SUPPORTING AND TRANSPORTING A BLEACHER

(76) Inventor: Keith Borglum, 218 Loma St., Waterloo, IA (US) 50701

( * ) Notice: Subject to any disclaimer, the term of this patent is extended or adjusted under 35 U.S.C. 154(b) by 240 days.

(21) Appl. No.: 10/876,055

(22) Filed: Jun. 24, 2004

(65) Prior Publication Data
US 2005/0062258 A1    Mar. 24, 2005

Related U.S. Application Data

(60) Provisional application No. 60/480,912, filed on Jun. 24, 2003.

(51) Int. Cl.
B62D 63/08    (2006.01)

(52) U.S. Cl. .............. 280/414.5; 280/43.24; 280/87.05; 280/278; 280/656; 280/414.1; 280/638

(58) Field of Classification Search .......... 280/124.149, 280/6.153, 656, 6.15, 762, 763.1, 764, 43.15, 280/414.5, 43.24, 414.1, 43.22, 638, 87.05, 280/278
See application file for complete search history.

(56) References Cited

U.S. PATENT DOCUMENTS

| | | | |
|---|---|---|---|
| 2,587,159 A | | 2/1952 | Holmes |
| 2,990,966 A | * | 7/1961 | Schramm ............ 414/476 |
| 3,253,839 A | | 5/1966 | Warren |
| 4,008,902 A | * | 2/1977 | Dill .................. 280/43.23 |
| 4,611,439 A | | 9/1986 | Graham, Jr. |
| 5,161,814 A | * | 11/1992 | Walker ............... 280/414.5 |
| 5,349,789 A | | 9/1994 | Andert et al. |
| 5,380,143 A | | 1/1995 | Mohan |
| 5,660,000 A | | 8/1997 | MacIntyre |
| 5,979,125 A | | 11/1999 | Guillet |
| 6,003,270 A | | 12/1999 | MacIntyre |
| 6,474,672 B1 | * | 11/2002 | Briscese ............ 280/414.5 |
| 6,499,258 B1 | | 12/2002 | Borglum |
| 6,592,139 B1 | * | 7/2003 | Shanahan ............ 280/414.5 |
| 6,923,452 B1 | * | 8/2005 | Zachmeier et al. ...... 280/6.151 |
| 6,935,656 B2 | * | 8/2005 | Stout ................ 280/769 |
| 2002/0148398 A1 | * | 10/2002 | Mensch ............ 114/61.15 |

* cited by examiner

*Primary Examiner*—J. Allen Shriver
*Assistant Examiner*—Cynthia F. Collado
(74) *Attorney, Agent, or Firm*—Andrus, Sceales, Starke & Sawall, LLP

(57) ABSTRACT

A trailer apparatus is for use with a portable bleacher of the type having a lower framework supporting and interconnecting a plurality of generally parallel longitudinally extending bleacher seat assemblies. The framework includes longitudinally spaced laterally extending base members. The trailer apparatus includes a torque tube rotatably attached to a lower part of the bleacher framework and above the base members to extend beneath and generally perpendicular to the seat assemblies. A torque arm is rigidly attached to one end of the torque tube. A first wheel assembly is rotatably coupled to the torque arm on an axis of rotation parallel to the torque tube axis. A generally vertically or horizontally extendable lift jack is coupled at a lower end to the torque arm and operatively coupled at its upper end to the framework. A lift jack operator moves the lift jack between an extended position to rotate the torque tube in one direction to move the first wheel assembly to a lower trailering position and a retracted position to rotate the torque tube in the opposite direction to move the first wheel assembly to a raised position.

17 Claims, 7 Drawing Sheets

APPARATUS FOR SUPPORTING AND TRANSPORTING A BLEACHER

RELATED APPLICATION

The present application is based on and claims priority from U.S. Provisional Application Ser. No. 60/480,912, filed Jun. 24, 2003.

FIELD OF THE INVENTION

The present invention relates to an apparatus for supporting and transporting a bleacher. More particularly, the present invention relates to a trailer apparatus that includes means for supporting and transporting a variety of known bleacher structures and that can be easily operated by a single person from one side of the bleacher structure.

BACKGROUND OF THE INVENTION

There are various instances where indoor or outdoor events require seating for a viewing audience. Permanent seating, such as bleachers, is often provided for recurring events that are frequently held in the same place. Permanent bleachers typically employ a lower framework that supports and interconnects a plurality of generally parallel longitudinally extending bleacher seats. The framework typically includes longitudinally spaced laterally extending base members which provide ground support for the framework and seats.

Alternatively, for many one-time events or events that are less frequent, temporary seating such as portable bleachers are often employed. Portable bleachers are also often used to supplement existing permanent seating to increase seating capacity, if desired, for larger events. A desirable characteristic of such portable seating is that the mobile framework carrying the seating be user friendly and that the framework limit the effort involved in moving and positioning the bleacher.

Mobile frameworks, or portable bleacher apparatus, are known in which one section of the seating is permanently fixed to a wheeled framework and at least one other section of seating is pivotably mounted thereto. The apparatus forms a trailer which is pulled by, for example, a truck or utility vehicle. Hydraulic cylinders or other mechanical devices are often used to pivot the movable section between a nested, travel position and an operative, seating position. In order to stabilize and level the bleacher prior to use, a plurality of individually operated jacks are installed along each side of the framework. In operation, the operator must swivel each jack into a storage mode, and then each jack must be manually cranked from a squatting or kneeling position to adjust for the particular terrain. This necessitates that an operator expend a great deal of time and energy adjusting the jacks on each side of the framework.

It is therefore desirable to provide a means for transporting bleacher framework which does not require separate individual lifting means on each side of the bleacher framework. It is desirable to provide a bleacher transporting system, or trailer apparatus, which is simple to install and operate and which may be operated by a single person, thus limiting the labor intensive efforts required to maneuver and set up the bleacher framework. In addition, it is desirable to provide a trailer apparatus which employs a single lifting unit, such that the bleacher may be lifted and transported from one side of the bleacher by a single operator. Further, it is desirable to provide a trailer apparatus which may be used with a variety of stationary existing bleacher framework configurations.

SUMMARY OF THE INVENTION

The present invention relates to such a trailer apparatus for transporting bleacher which can be easily operated by a single person from one side of the bleacher framework. The trailer apparatus is generally intended for use with a bleacher of the type having a lower framework supporting and interconnecting a plurality of generally parallel longitudinally extending bleacher seat assemblies.

The trailer apparatus includes a torque tube operatively coupled to a lower part of the bleacher framework and above the base members to extend beneath and generally perpendicular to the seat assemblies. A torque arm is rigidly attached to one end of the torque tube. A first wheel assembly is rotatably coupled to the torque arm on an axis of rotation parallel to the torque tube axis. A generally vertically extendable lift jack is coupled at a lower end to the torque arm and operatively coupled at its upper end to the framework. A lift jack operator moves the lift jack between an extended position to rotate the torque tube in one direction to move the first wheel assembly to a lower trailering position and a retracted position to rotate the torque tube in the opposite direction to move the first wheel assembly to a raised position.

In a preferred embodiment, the vertically extendable lift jack is supported by forwardly and rearwardly angled braces coupled to the upper end of the lift jack and a longitudinally extending base brace interconnecting the forwardly and rearwardly angled braces.

BRIEF DESCRIPTION OF THE DRAWINGS

Preferred embodiments of the invention are described herein below with reference to the attached figures, wherein.

DETAILED DESCRIPTION OF THE PREFERRED EMBODIMENTS

In the preferred embodiments of the present invention described in detail below, a trailer apparatus for supporting and transporting a bleacher is provided. It should be understood that the drawings and specification are to be considered an exemplification of the principles of the invention, which is more particularly defined in the appended claims. For example, although the trailer apparatus is shown as supporting a particular bleacher configuration, it is recognized that the trailer apparatus is suitable for use with a variety of bleachers of the type having a lower framework supporting and interconnecting a plurality of generally parallel longitudinally extending bleacher seat assemblies.

Figure 1:
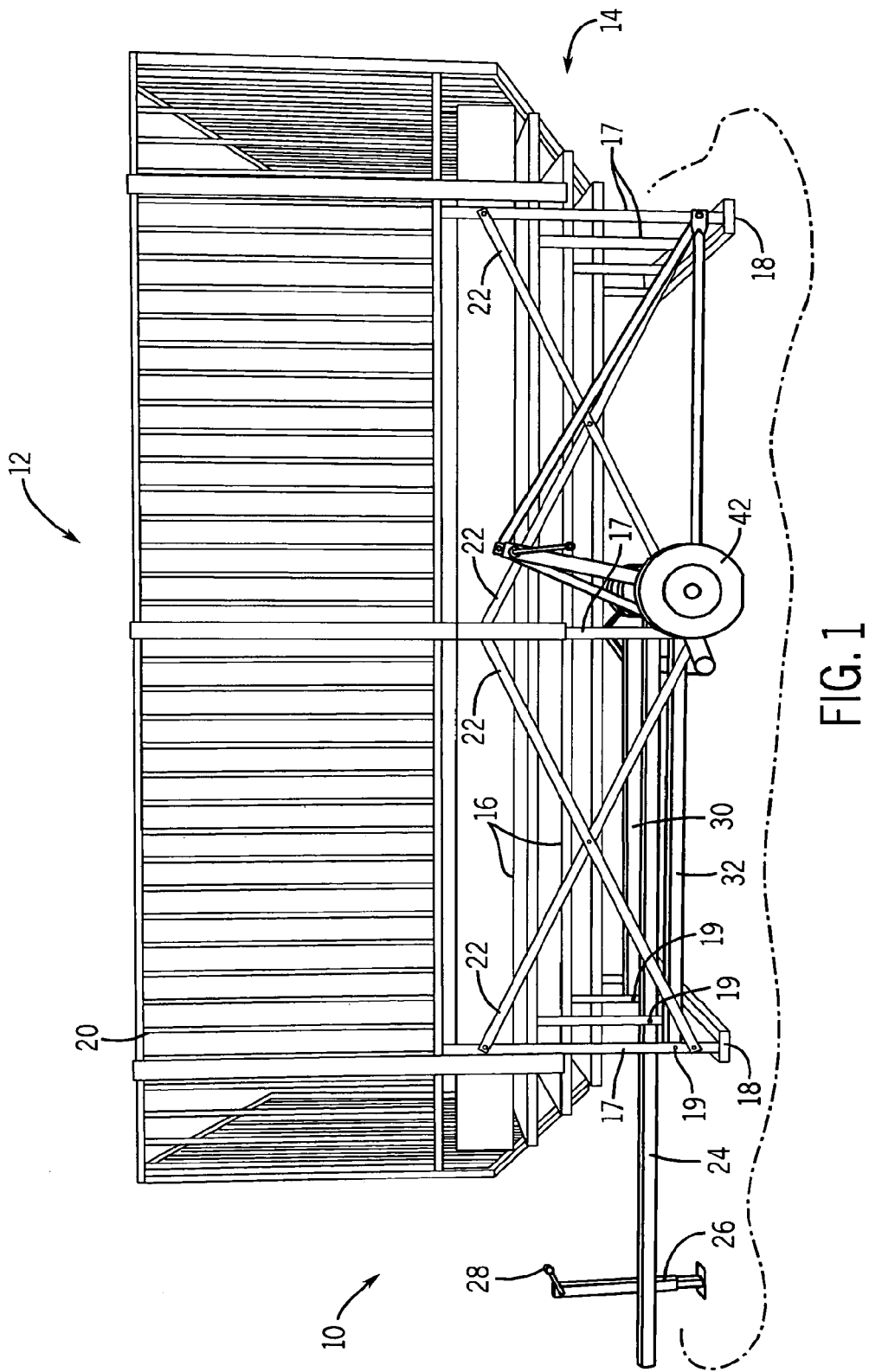
FIG. 1 is a rear elevation view of the trailer apparatus of the present invention connected to the lower framework of a bleacher.

As shown in FIG. 1, the trailer apparatus 10 is positioned beneath and supports a bleacher 12. The bleacher 12 is of the type having a lower framework 14 supporting and interconnecting a plurality of generally parallel longitudinally extending bleacher seat assemblies 16. The framework 14 includes longitudinally spaced laterally extending base members 18 transversely connected to and extending from a plurality of vertical support legs 17. In addition, the framework includes intersecting brace members 22 extending between the support legs 17. The bleacher 12 also includes a series of side and rear vertical top rails 20 disposed along the rear and sides of the seat assemblies 16.

The trailer apparatus 10 includes an inner support beam 24 extending longitudinally from a lower side of the bleacher framework 14. The inner support beam 24 extends horizontally out fro beneath the bleacher assembly such that its free outer end is a tongue 25 for the trailer. The tongue is provided with a lift jack 26 for supporting the trailer apparatus 10 when it is unhitched from a trailering vehicle (not shown). As is well known in the art, when the tongue portion 25 of the inner support beam 24 is hitched to the trailering vehicle, the lift jack operator 28 on the lift jack 26 is rotated to move the lift jack 26 into a raised position (i.e., off the ground), such that the trailering apparatus 10 is supported by the inner support beam 24 and the trailering vehicle.

As shown in FIG. 1, the trailer apparatus 10 further includes outer longitudinally extending support beams 30, 32. In the embodiment shown in FIG. 1, each of the outer longitudinally extending support beams 30, 32 and the inner support beam 24 are coupled at both ends to the support legs 17 of the lower framework 14 by bolt connections 19. However, it is recognized that any one of a variety of connections well known in the art to fixedly secure the outer longitudinally extending support beams 30, 32 and inner support beam 24 to the lower framework 14 may be employed.

Figure 2:
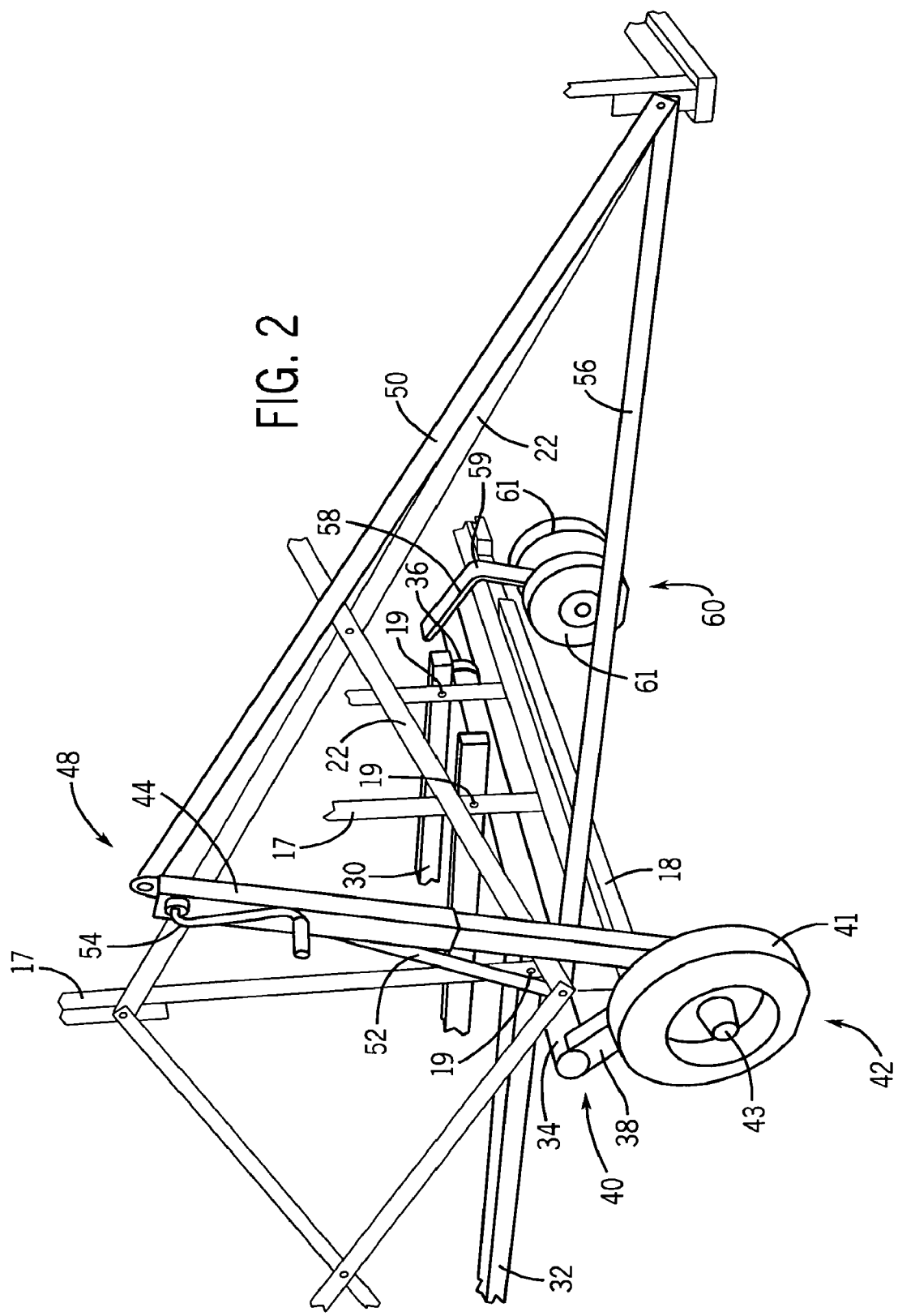
FIG. 2 is a detailed perspective view of a preferred embodiment of the trailer apparatus.

Referring to FIG. 2, the trailer apparatus 10 includes a torque tube 34 which is operatively coupled to a lower part of the bleacher framework 14 and above the base member 18. Preferably, the torque tube 34 is coupled to the bleacher framework 14 near the longitudinal center of the bleacher 12. In the embodiment shown, the torque tube 34 is rotatably attached to the undersides of the outer support beams 30, 32 by U-clamps 36.

A torque arm 38 is rigidly attached to one end 40 of the torque tube 34. In the embodiment shown, the torque arm 38 is welded to the one end 40 of the torque tube 34. It is recognized however that various other means for fixedly attaching the torque arm 38 to the torque tube 34 may be employed. It is also recognized that the torque arm 38 may form part of, or an extension of the torque tube 34.

Figure 3:
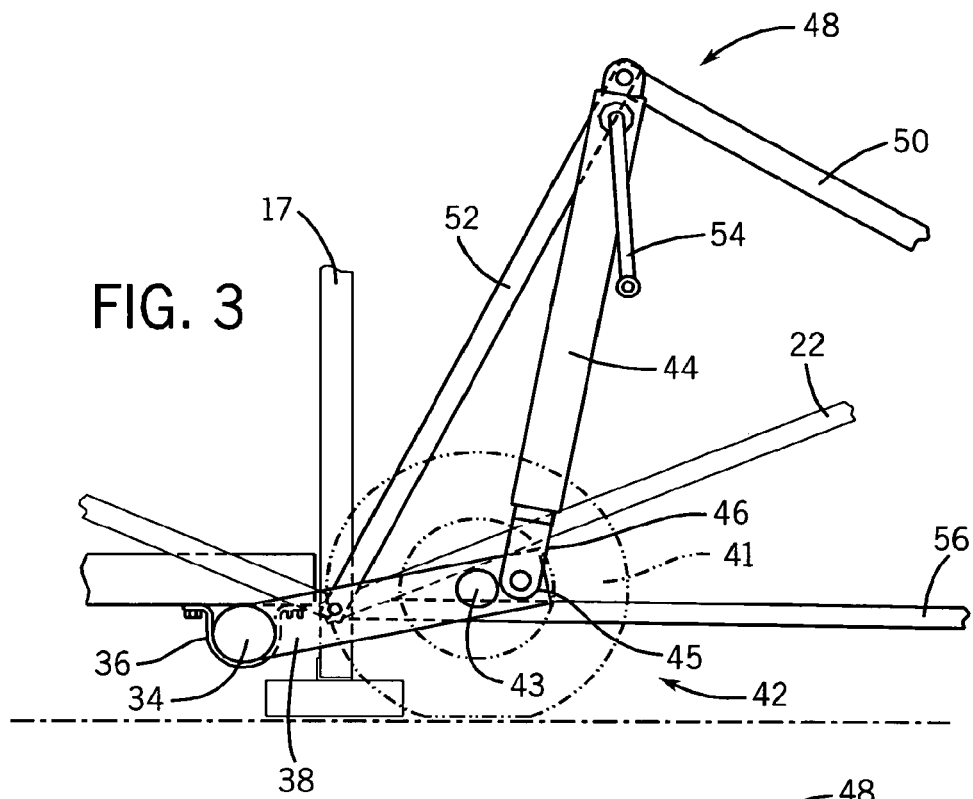
FIG. 3 is a side view of the torque tube, torque arm and lift jack operator in a retracted position.
Figure 4:
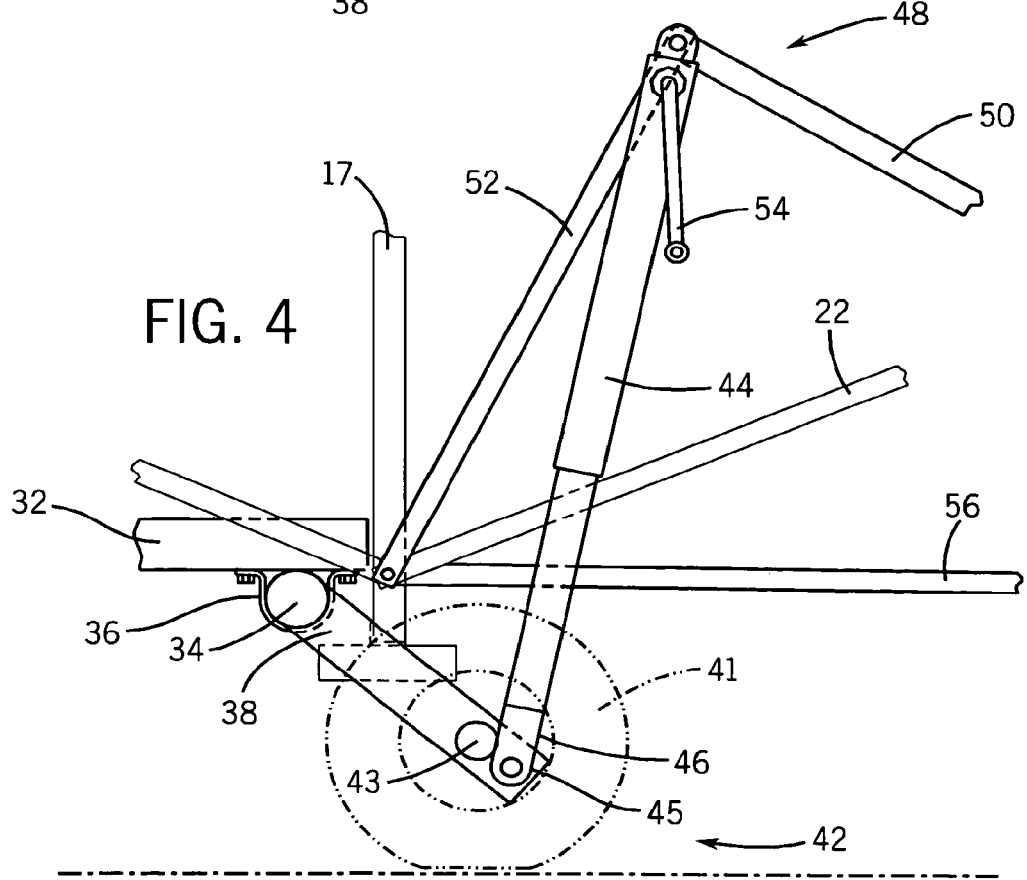
FIG. 4 is a side view of torque tube, torque arm and lift jack operator in an extended position.

Referring to FIGS. 2, 3 and 4, a first wheel assembly 42 is rotatably coupled to the torque arm 38 on an axis of rotation parallel to the axis of rotation of the torque tube 34. More specifically, the wheel 41 rotates about a axle 43 which is attached to the torque arm 38.

A generally vertically extendable manual lift jack 44 is coupled at its lower end 46 to the torque arm 38. The lift jack 44 has a lift jack operator 54, which in the embodiment shown is a manually operable crank. As is known in the art, manually rotating the lift jack operator 54 in one direction, such as clockwise, forces the lift jack to extend, as shown in FIGS. 2 and 4. Conversely, manually rotating the lift jack operator 54 in the opposite direction, such as counterclockwise, forces the lift jack to contract, as shown in FIG. 3. It is recognized that any known lift jack, such as for example an electronically automatic lift jack, may be substituted for the manual lift jack 44 shown and described herein.

Clevis 45 pivotally interconnects the lower end 46 of the lift jack 44 to the torque arm 38. In this manner, extension of the lift jack 44 causes the torque arm 38 to rotate clockwise about the longitudinal axis formed by the torque tube 34. Simultaneously, clockwise rotation of the torque arm 38 causes the torque tube 34 to rotate clockwise within the U-clamps 36.

The upper end 48 of the lift jack 44 is pivotally coupled to a forwardly angled brace 50 and a rearwardly angled brace 52. The forwardly angled brace 50 and rearwardly angled brace 52 are joined at their distal ends, with respect to the upper end 48, to the lower framework 14. As such, the forwardly angled brace 50 and rearwardly angled brace 52 form a portion of the lower framework 14. The forwardly angled brace 50 and rearwardly angled brace 52 may be further joined by a longitudinally extending base brace 56, to form a support truss for supporting the lift jack 44. Each of the connections between the forwardly angled brace 50, rearwardly angled brace 52 and longitudinally extending base brace 56 comprise bolt connections, however it is recognized that these elements may be connected by other means for providing fixed connections that are well known in the art.

Figure 5:
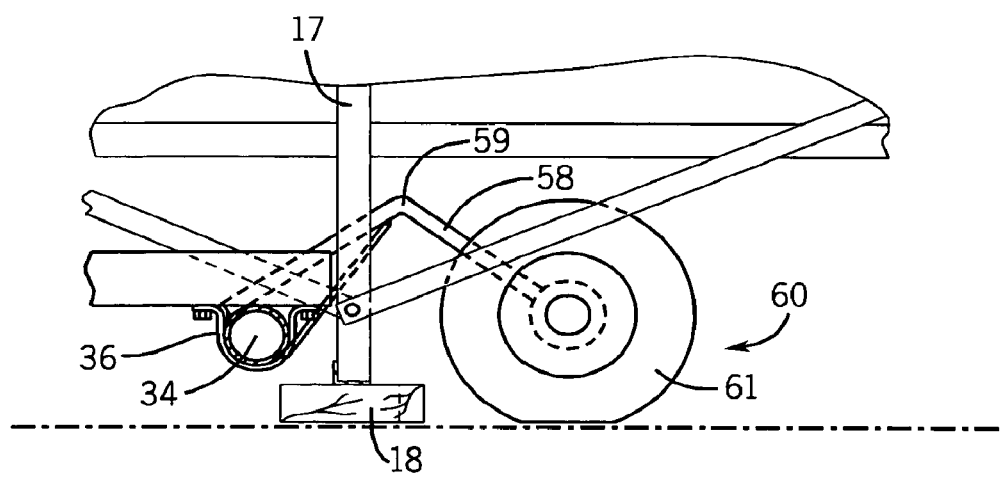
FIG. 5 is a side view of the angled wheel support in a raised position.
Figure 6:
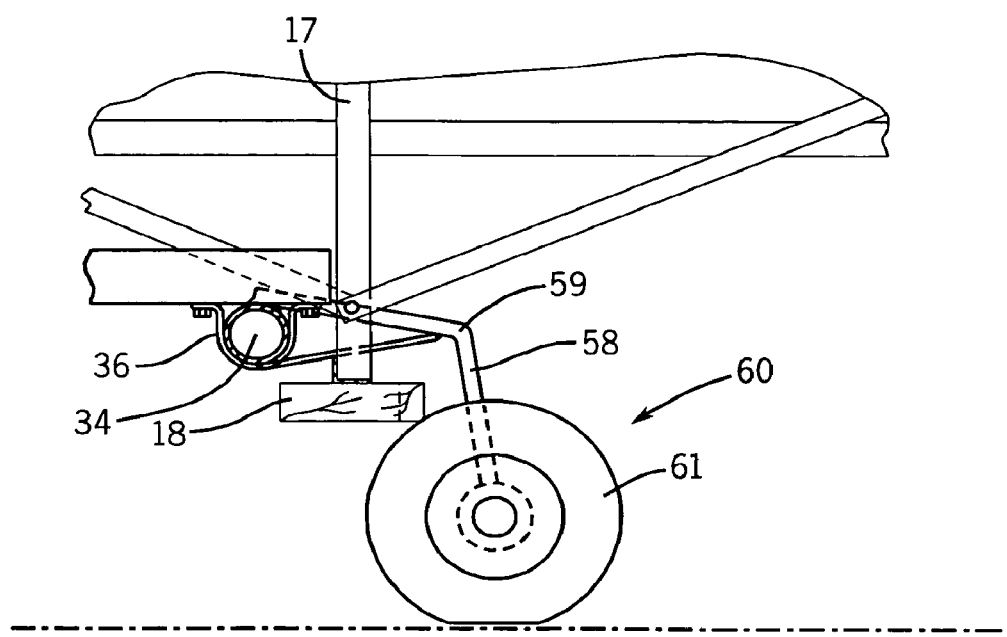
FIG. 6 is a side view of the angled wheel support in a lower trailering position.

Referring to FIGS. 2, 5 and 6, an angled wheel support 58 is rigidly coupled to the torque tube 34 and spaced apart from the torque arm 38. A second wheel assembly 60, including a pair of wheels 61, is rotatably attached to the angled wheel support 58. The angled wheel support 58 has a central bent portion 59, and rotates along with the torque tube 34 to position the second wheel assembly 60 generally beneath the base member 18, as will be described further below.

Referring back to FIGS. 3 and 4, the trailer apparatus 10 is positioned into and out of a trailering position by a single operator at a single side of the bleacher 12. FIG. 3 depicts the torque tube 34, torque arm 38 and lift jack 44 in a retracted position wherein the first wheel assembly 42 is raised above or at least in-line with the base member 18 of the lower framework 14. This is accomplished by retracting the lift jack 44 by manually turning the lift jack operator 54 in a counter-clockwise direction. As the lift jack 44 is retracted, the torque arm 38 and rigidly attached torque tube 34 are rotated counter clockwise relative to the vertical support leg 17 and the first wheel assembly 42 is raised above or at least in line with the base member 18.

As shown in FIG. 4, to maneuver the trailer apparatus 10 into an extended trailering position, the lift jack 44 is extended by manually turning the lift jack operator 54 in a clockwise direction. Extension of the lift jack 44 rotates the torque arm 38 and torque tube 34 clockwise, such that the first wheel assembly 42 is positioned lower than or below the base member 18. In this manner, the base member 18 is raised off the ground and the first wheel assembly 42 movably supports the bleacher 12.

Simultaneously, referring to FIGS. 5 and 6, as the lift jack 44 is extended into a trailering position, the angled wheel support 58 also rotates, along with the torque tube 34 into an extended trailering position. More specifically, extension of the lift jack 44 causes the angled wheel support 58 to rotate in a clockwise direction, similar to the torque arm 38. The angled wheel support 58 thus positions the second wheel assembly 60 beneath the base member 18 of the framework 14 to movably support the bleacher 12, as shown in FIG. 6.

It should thus be apparent that the trailering apparatus 54 is positionable into and out of a trailing position by a single person from only one side of the bleacher 12. It should also be apparent that the trailering apparatus 10 is adaptable to function with a variety of known stationary bleacher structures.

Figure 7:
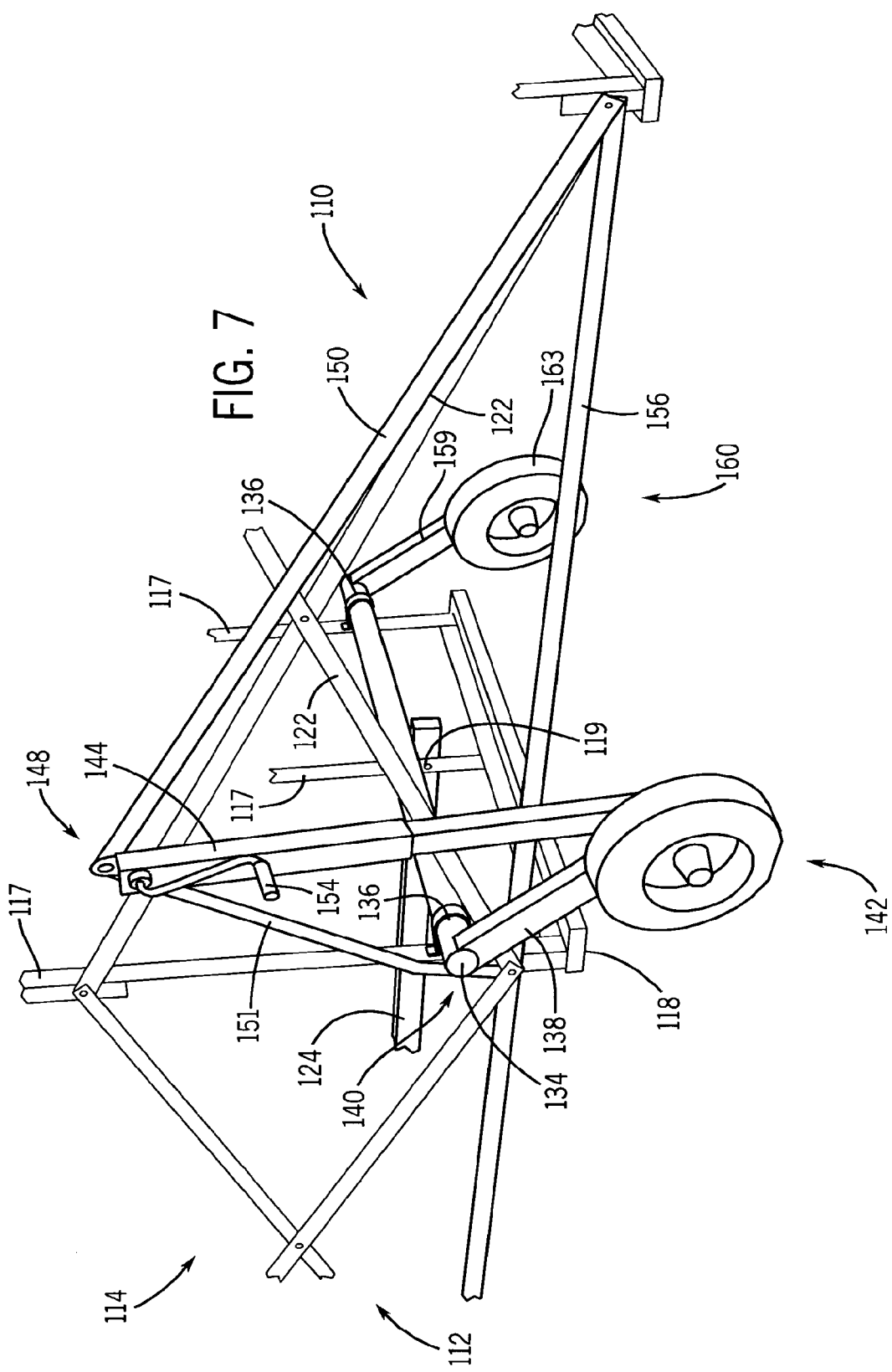
FIG. 7 is a detailed perspective view of a second embodiment of the trailer apparatus.

Now referring to FIG. 7, an alternate embodiment of the trailer apparatus 10 of the present invention is shown. Similar reference numerals will be applied, on the order of one magnitude greater than the previous embodiment described.

As shown in FIG. 7, a trailer apparatus 110 is positioned beneath and supports a bleacher 112. The bleacher 112 is of the type having a lower framework 114 supporting and interconnecting a plurality of generally parallel longitudinal extending bleacher seat assemblies (not shown). The lower framework 114 includes longitudinally spaced laterally extending base members 118 transversely connected to and extending from a plurality of vertical support legs 117. In addition, the framework includes intersecting brace members 122 extending between the support legs 117.

The trailer apparatus 110 includes an inner support beam 124 coupled to and extending horizontally from a lower side of the bleacher framework 114. In the embodiment shown, the inner support beam 124 is attached to the vertical support leg 117 by a bolt connection 119.

The trailer apparatus 110 also includes a torque tube 134 which is operatively coupled to a pair of support legs 117, and preferably situated near the longitudinal center of the lower framework 114 and above the base members 118. In the embodiment shown, the torque tube 134 is rotatably attached to each of the support legs 117 by U-clamps 136.

A torque arm 138 is rigidly attached to one end 140 of the torque tube 134. In the embodiment shown, the torque arm 138 is welded to the one end 140 of the torque tube 134. A first wheel assembly 142 is rotatably coupled to the torque arm 138 on an axis of rotation parallel to the axis of rotation of the torque tube 134. A generally vertically extendable lift jack 144 is coupled at its lower end 146 to the torque arm 138. The upper end 148 of the lift jack 144 is pivotally coupled to a forwardly angled and bent brace 151 and a rearwardly angled brace 152. The lift jack 144 has a lift jack operator 154, which in the embodiment shown is a manually operated crank.

The bent brace 151 and rearwardly angled brace 150 are joined at their distal ends, with respect to the upper end 148, to the lower framework 114. As such, the bent brace 151 and rearwardly angled brace 150 form a portion of the lower framework 114. The bent brace 151 and rearwardly angled brace 150 are further joined by a longitudinally extending base brace 156, to form a support truss for the lift jack 144. Each of the connections between the bent brace 151, rearwardly angled brace 150 and longitudinally extending base brace 156 are bolt connections, however it is recognized that these elements may be connected by other means which provide for a fixed connection that are well known in the art.

A wheel support 159 is rigidly coupled to the torque tube 134 and spaced apart from the torque arm 138. A second wheel assembly 160 including a single wheel 163 is rotatably attached to the wheel support 159. The wheel support 159 rotates along with the torque tube 134, to position the second wheel assembly 160 generally beneath the base member 118 similar to the embodiment shown in FIGS. 5 and 6 above.

Figure 8:
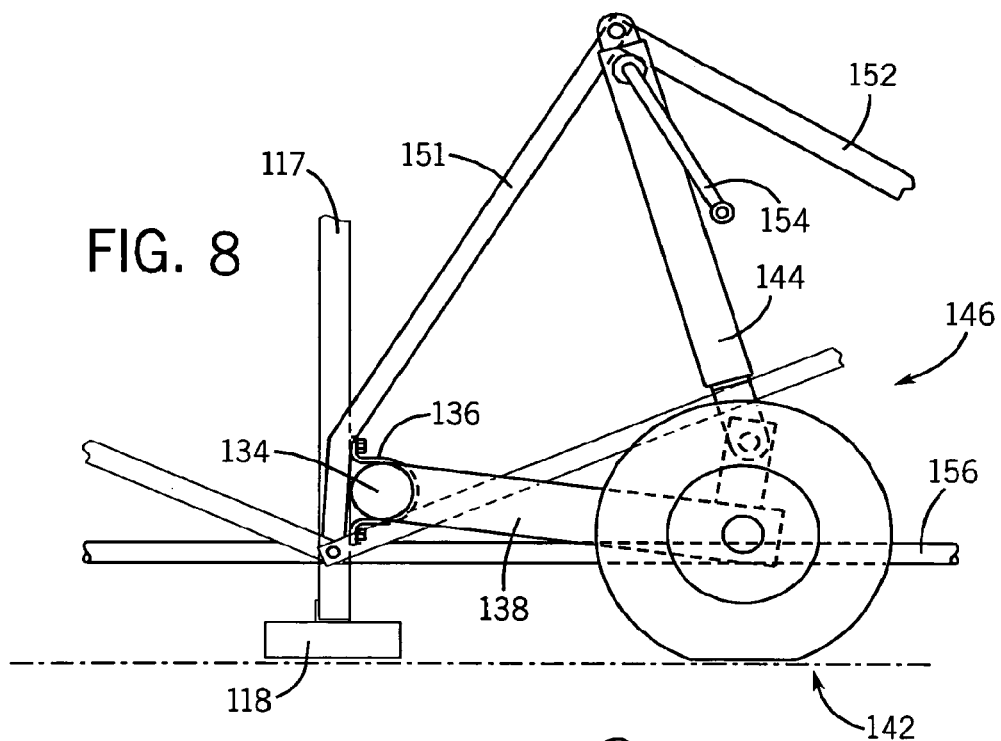
FIG. 8 is a side view of the torque tube, torque arm and lift jack operator in a retracted position.
Figure 9:
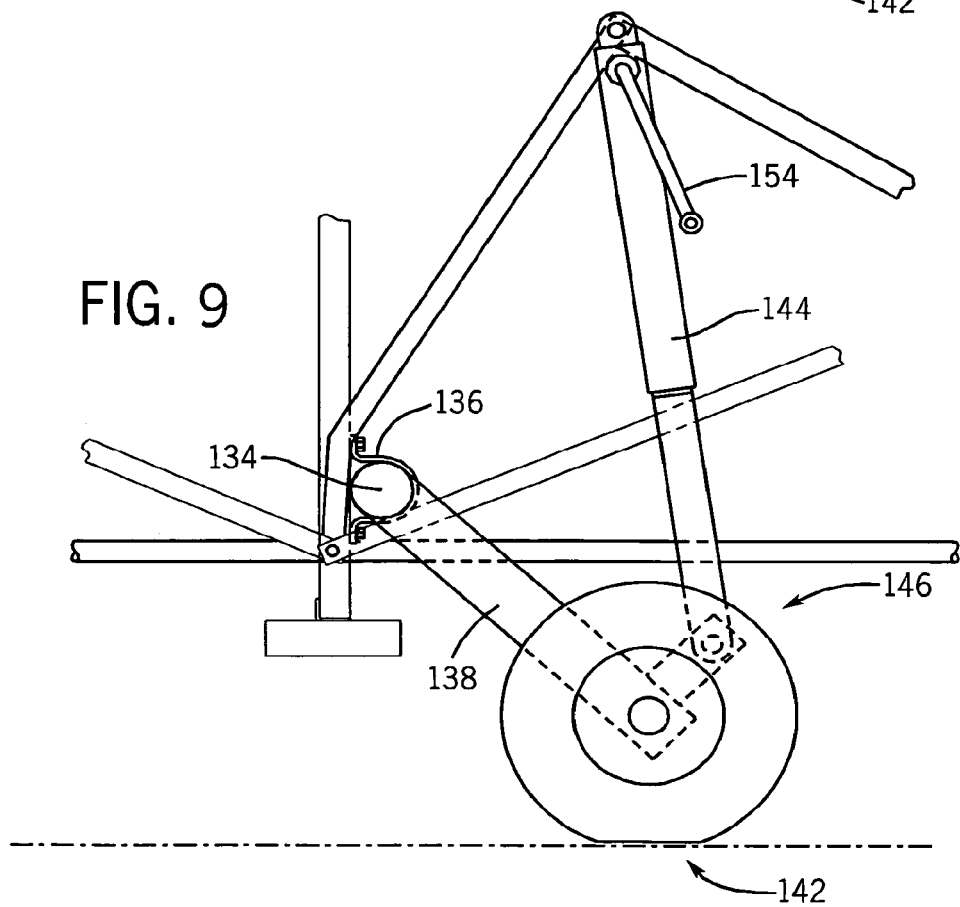
FIG. 9 is a side view of the torque tube, torque arm and lift jack operator in an extended position.

Referring to FIGS. 8 and 9, the trailer apparatus 110 is positioned into and out of an operational position by a single operator at a single side of the bleacher 112. FIG. 8 depicts the torque tube 134, torque arm 138 and lift jack 144 in a retracted position, wherein the first wheel assembly 142 is raised above or at least in line with the base member 118 of the lower framework 114. This is accomplished by retracting the lift jack 144 by manually turning the lift jack operator 154 in a counterclockwise direction. In doing so, the torque arm 138 and rigidly attached torque tube 134 are rotated counterclockwise relative to the vertical support leg 117.

As shown in FIG. 9, to maneuver the trailer apparatus into an extended trailering position, the lift jack 144 is extended by manually turning the lift jack operator 154 in the opposite direction, such as clockwise, and rotating the torque arm 138 and torque tube 134 clockwise, such that the first wheel assembly 142 is positioned lower than or below the base member 118. In such a manner, the base member 118 is raised off the ground and the first wheel assembly 142 movably supports the bleacher 112.

As shown in FIG. 7, as the lift jack 144 is extended into a trailering position, the wheel support 159 rotates with the torque tube 134 into an extended trailering position. More specifically, rotation of the torque tube 134, which is caused by extension of the lift jack 144 and rotation of the torque arm 138, further causes the wheel support 159 to rotate in a similar clockwise direction. The wheel support 159 thus positions the second wheel assembly 160 beneath the base member 118 of the framework 114 to movably support the bleacher 12, as shown in FIG. 7.

In a further embodiment of the invention, the lift jack 44 is mounted in a generally horizontal position which is particularly desirable for bleachers having less than five rows of seats 16. A vertically oriented lift jack, such as described for the preceding embodiments, has a vertical extent that is too large for bleachers having less than five rows.

Figure 10:
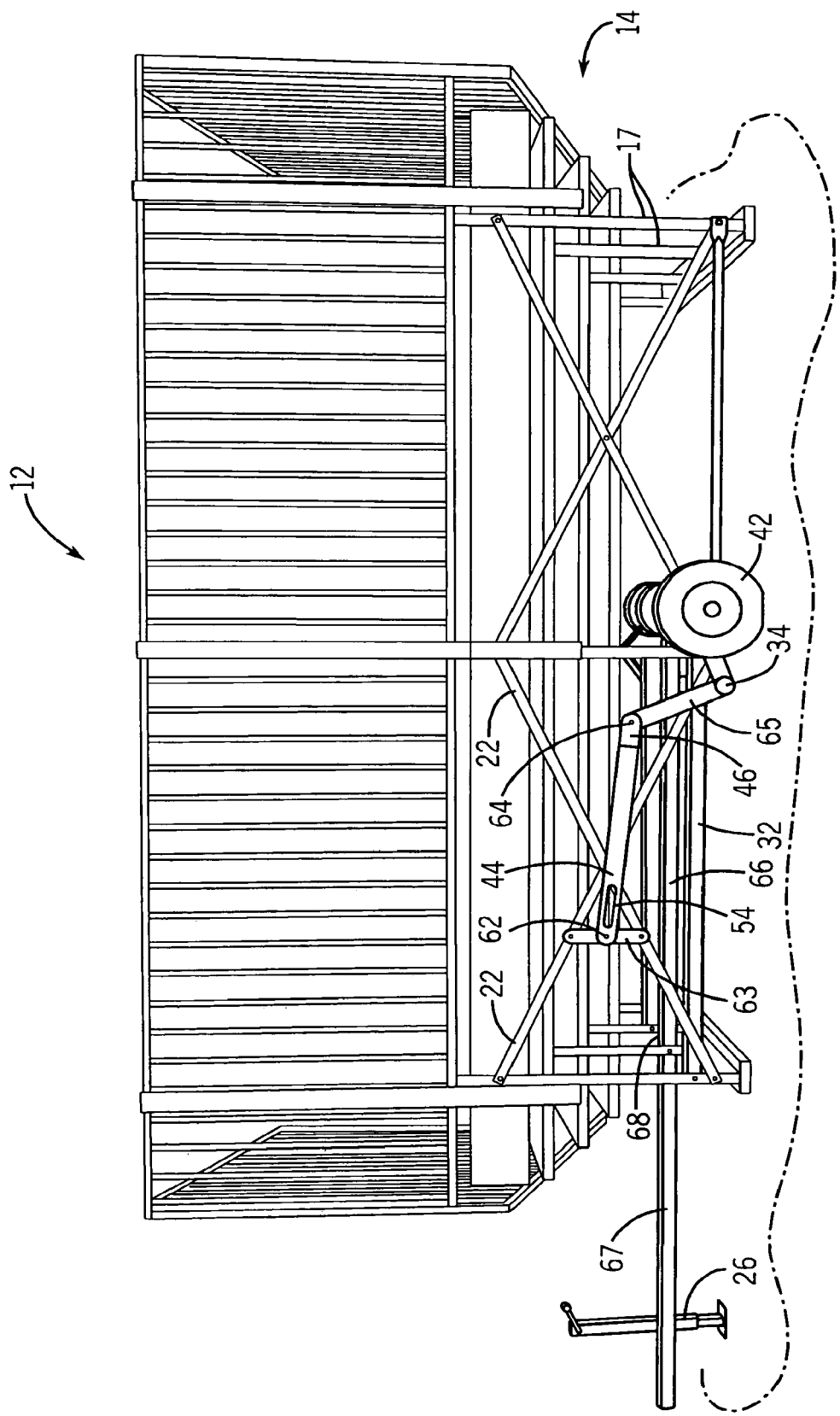
FIG. 10 is a view similar to FIG. 1 showing an alternate embodiment of the lift operator.

Referring particularly to FIG. 10, the lift jack 44 is attached at one end with a rotatable pinned connection 62 either directly to an X-brace member 22 or, as shown, to a short strut 63 rigidly attached between X-brace members 22. The other end 46 of the lift jack 44 is attached with a pinned connection 64 to the upper end of a lift arm 65, the lower end of which is rigidly attached to the torque tube 34. In the FIG. 10 position, the lift jack 44 is retracted and likewise the wheel assembly 42 is in its upper retracted position. Operation of the lift jack operator 54 causes the end 46 of the lift jack to extend, thereby rotating the lift arm 65 and rigidly attached torque tube 34 in a clockwise direction to lower the wheel assembly 42 to the lower trailering position.

Although the lift jack operator 54 is positioned somewhat lower than in the previously described embodiments, it is nevertheless readily accessible to an operator standing at the rear of the bleacher.

As also shown in FIG. 10, the inner support beam 24 of the previously described embodiments, the end of which comprised a tongue 25 for attachment to a tow vehicle, is replaced in this embodiment with a support beam 66 comprising a hollow box beam. A modified tongue 67, comprising a tubular member of circular cross section is telescoped in the short support beam 66 such that it can be pushed inside the support beam for convenient storage and retracted therefrom to a trailering position where it is held in place by a hitch pin 68.

It will thus be seen that the present invention provides a means for transporting a bleacher framework that does not require separate individual lifting means on each side of the bleacher framework. The present invention further provides a bleacher transporting system which is simple to install and operate and which may be operated by a single person, thus limiting the labor intensive efforts required to maneuver and set up the bleacher framework. In addition, the present invention provides a trailer apparatus which employs a single lifting unit, such that the bleacher is lifted and transported from one of the bleacher by a single operator. The present invention further provides a trailer apparatus which may be used with a variety of stationary existing bleacher framework configurations.

While this invention is susceptible to embodiments in many different forms, the drawings and specification describe in detail a preferred embodiment of the invention. They are not intended to limit the broad aspects of the invention to the embodiment illustrated. For example, although the embodiments shown depict a trailering apparatus that employs only first and second wheel assemblies, it is recognized that additional wheel assemblies may be employed for, for example, larger bleacher frameworks.

I claim:

1. A trailer apparatus for a bleacher of the type having a lower framework supporting and interconnecting a plurality of generally parallel longitudinally extending bleacher seat assemblies, said framework including longitudinally spaced laterally extending base members, said trailer apparatus comprising:
    a torque tube rotatably attached for rotation on its axis to a lower part of the bleacher framework and above the base members to extend beneath and generally perpendicular to the seat assemblies;
    a torque arm rigidly attached to the torque tube;
    a first wheel assembly rotatably coupled to said torque arm on an axis of rotation parallel to the torque tube axis;
    an extendable lift mechanism coupled to said torque arm and operatively coupled at its other end to the framework; and,
    a lift mechanism operator for moving said lift mechanism between an extended position to rotate the torque tube on its axis in one direction to move said first wheel assembly to a lower trailering position with at least portions of said first wheel assembly below the base members and a retracted position to rotate the torque tube on its axis in the opposite direction to move said first wheel assembly to a raised position at least level with or above said base members.

2. The trailer apparatus of claim 1, further comprising:
    at least one longitudinally extending support beam connected to a lower portion of said bleacher framework, wherein said torque tube is operatively coupled to said at least one support beam.

3. The trailer apparatus of claim 2, further comprising three longitudinally extending support beams, namely a pair of outer support beams and an inner support beam, wherein said torque tube is operatively coupled to said pair of outer support beams.

4. The trailer apparatus of claim 1 wherein the extendable lift mechanism comprises an elongated lift jack.

5. The trailer apparatus of claim 4 wherein the lift jack is oriented to extend generally vertically.

6. The trailer apparatus of claim 4 wherein the lift jack is oriented to extend generally horizontally.

7. The trailer apparatus of claim 1, further comprising:
    a support rigidly coupled to said torque tube and connected to a second wheel assembly, said second wheel assembly rotatable on the axis of rotation of said first wheel assembly.

8. The trailer apparatus of claim 7, wherein said wheel support comprises an angled portion.

9. The trailer apparatus of claim 1, wherein said lift mechanism operator comprises a manually operable crank.

10. The trailer apparatus of claim 1 wherein said framework comprises a forwardly angled brace coupled to said other end of said lift mechanism.

11. The trailer apparatus of claim 10 wherein said framework comprises a rearwardly angled brace coupled to said other end of said lift mechanism; and
    a longitudinally extending base brace interconnecting said forwardly angled brace and said rearwardly angled brace.

12. The trailer apparatus of claim 1 wherein said framework comprises a rearwardly angled brace coupled to said other end of said lift mechanism.

13. The trailer apparatus of claim 12, wherein said rearwardly angled brace comprises an inwardly bent portion.

14. The trailer apparatus of claim 2 further comprising a trailer hitch on one end of said longitudinally extending inner support beam.

15. The trailer apparatus of claim 14 wherein the inner support beam comprises a tubular construction and the trailer hitch is attached to one end of a tongue member, said tongue member mounted for telescoping movement axially within the inner support beam.

16. The trailer apparatus of claim 15 wherein the tongue member comprises a tubular construction.

17. The trailer apparatus of claim 1, wherein said torque tube is rotatably attached to said lower portion of the bleacher framework near the longitudinal center thereof.

* * * * *